US011867119B2

(12) United States Patent
Seki

(10) Patent No.: US 11,867,119 B2
(45) Date of Patent: Jan. 9, 2024

(54) ELECTRIC GENERATOR AND MULTI-SHAFT GAS TURBINE ENGINE FOR AIRCRAFT EQUIPPED WITH ELECTRIC GENERATOR

(71) Applicant: IHI Corporation, Tokyo (JP)

(72) Inventor: Naoki Seki, Tokyo (JP)

(73) Assignee: IHI Corporation, Tokyo (JP)

( * ) Notice: Subject to any disclaimer, the term of this patent is extended or adjusted under 35 U.S.C. 154(b) by 15 days.

(21) Appl. No.: 17/668,432

(22) Filed: Feb. 10, 2022

(65) Prior Publication Data

US 2022/0268205 A1 Aug. 25, 2022

Related U.S. Application Data

(63) Continuation of application No. PCT/JP2020/023990, filed on Jun. 18, 2020.

(30) Foreign Application Priority Data

Sep. 30, 2019 (JP) ................................. 2019-179771

(51) Int. Cl.
| | |
|---|---|
| *F02C 6/00* | (2006.01) |
| *F01D 15/10* | (2006.01) |
| *F02C 7/06* | (2006.01) |
| *F02C 7/36* | (2006.01) |
| *H02K 7/08* | (2006.01) |

(Continued)

(52) U.S. Cl.
CPC ................ *F02C 6/00* (2013.01); *F01D 15/10* (2013.01); *F02C 7/06* (2013.01); *F02C 7/36* (2013.01); *H02K 7/02* (2013.01); *H02K 7/085* (2013.01); *H02K 7/1823* (2013.01); *F05D 2220/76* (2013.01); *F05D 2240/50* (2013.01)

(58) Field of Classification Search
CPC ... F02C 6/00; F02C 7/36; F01D 15/10; H02K 7/085; H02K 7/12; H02K 7/1823; H02K 5/1735; F05D 2220/76; F02K 5/00
See application file for complete search history.

(56) References Cited

U.S. PATENT DOCUMENTS 2,487,328 A * 11/1949 Wallace ............... H02K 7/1815
310/201
5,376,827 A 12/1994 Hines
(Continued)

FOREIGN PATENT DOCUMENTS

DE 10 2010 014 968 A1 10/2011
EP 798454 A2 * 10/1997 .............. F02C 3/113
(Continued)

OTHER PUBLICATIONS

Japanese Office Action dated Mar. 22, 2023 in Japanese Patent Application No. 2021-550327, 2 pages.
(Continued)

*Primary Examiner* — Pedro J Cuevas
(74) *Attorney, Agent, or Firm* — Oblon, McClelland, Maier & Neustadt, L.L.P.

(57) ABSTRACT

An electric generator equipped in a multi-shaft gas turbine engine for aircraft, includes: a rotor attached to the rear end portion of a low-pressure shaft rotatably supported by a bearing in the gas turbine engine; a stator provided around the rotor; wherein the electric generator has no structure to support the low-pressure shaft and the rotor.

11 Claims, 3 Drawing Sheets

(51) Int. Cl.
*H02K 7/12* (2006.01)
*H02K 7/18* (2006.01)
*H02K 7/02* (2006.01)

(56) References Cited

U.S. PATENT DOCUMENTS

| | | | | |
|---|---|---|---|---|
| 5,867,979 | A * | 2/1999 | Newton | F02C 3/113 |
| | | | | 310/90.5 |
| 6,378,293 | B1 | 4/2002 | Care et al. | |
| 6,661,151 | B2 * | 12/2003 | Tan | H02K 21/044 |
| | | | | 310/263 |
| 10,458,338 | B2 * | 10/2019 | Szczepanowski | F02C 7/275 |
| 11,143,110 | B2 * | 10/2021 | Szczepanowski | F02C 7/275 |
| 2002/0053855 | A1 * | 5/2002 | Tan | H02K 21/044 |
| | | | | 310/263 |
| 2006/0137355 | A1 * | 6/2006 | Welch | H02K 7/1823 |
| | | | | 60/802 |
| 2006/0138779 | A1 | 6/2006 | Bouiller et al. | |
| 2006/0138888 | A1 | 6/2006 | Bouiller et al. | |
| 2008/0143115 | A1 | 6/2008 | Kern et al. | |
| 2010/0327589 | A1 | 12/2010 | Macchia | |
| 2014/0093357 | A1 | 4/2014 | Polacco et al. | |
| 2014/0252769 | A1 | 9/2014 | Menheere et al. | |
| 2017/0107911 | A1 * | 4/2017 | Szczepanowski | F02C 7/268 |
| 2018/0051701 | A1 * | 2/2018 | Kupiszewski | F01D 25/24 |
| 2019/0316486 | A1 * | 10/2019 | Roberge | H02K 7/116 |
| 2020/0025096 | A1 * | 1/2020 | Szczepanowski | F02C 7/275 |
| 2022/0045573 | A1 * | 2/2022 | Seki | H02K 5/225 |
| 2022/0268205 | A1 * | 8/2022 | Seki | F02K 5/00 |
| 2023/0203995 | A1 * | 6/2023 | Morgan | F02C 6/00 |
| | | | | 290/52 |

FOREIGN PATENT DOCUMENTS

| | | | | |
|---|---|---|---|---|
| EP | 1031715 | A2 * | 8/2000 | F01D 15/10 |
| EP | 3 293 860 | A1 | 3/2018 | |
| EP | 4148247 | A1 * | 3/2023 | F02C 7/06 |
| GB | 1141001 | A | 1/1969 | |
| GB | 2443743 | A * | 5/2008 | F02C 7/262 |
| GB | 2610573 | A * | 3/2023 | F02C 7/06 |
| JP | 2006-144788 | A | 6/2006 | |
| JP | 2006-153013 | A | 6/2006 | |
| JP | 2008-151122 | A | 7/2008 | |
| WO | WO-2015088606 | A2 * | 6/2015 | F01D 13/006 |

OTHER PUBLICATIONS

International Search Report dated Aug. 18, 2020 in PCT/JP2020/023990 filed on Jun. 18, 2020, 2 pages.
Office Action dated Aug. 1, 2023, in corresponding Japanese Patent Application No. 2021-550327, 2 pages.
Extended European Search Report dated Sep. 13, 2023 in the counterpart European application No. 20873267.7.

* cited by examiner

ELECTRIC GENERATOR AND MULTI-SHAFT GAS TURBINE ENGINE FOR AIRCRAFT EQUIPPED WITH ELECTRIC GENERATOR

CROSS REFERENCE TO RELATED APPLICATIONS

This application is a continuation application of International Application No. PCT/JP2020/023990, now WO2021/065100A1, filed on Jun. 18, 2020, which claims priority to Japanese Patent Application No. 2019-179771, filed on Sep. 30, 2019, the entire contents of which are incorporated by reference herein.

BACKGROUND

1. Technical Field

The present disclosure relates to an electric generator and a multi-shaft gas turbine engine for aircraft equipped with the electric generator.

2. Description of the Related Art

A Gas turbine engine for aircraft is equipped with propulsion mechanisms such as compressors and turbines, as well as an electric generator for supplying electric power to an electrical system in the aircraft. The electric generator is installed in an accessory gearbox (AGB) provided near a fan case or compressor case. The electric generator is required to have an output of several tens to several hundred kW. As the electric generator, a synchronous electric generator is frequently used. The synchronous electric generator has a field coil (electromagnet) as a rotor.

A multi-shaft gas turbine engine includes multiple stages of compressors and turbines. In this engine, a high-pressure shaft (high-pressure spool) connects between a high-pressure compressor and a high-pressure turbine, and an electric generator is connected to the high-pressure shaft via a gearbox, a drive shaft, and the like. A part of the rotational energy of the high-pressure shaft is transmitted to the electric generator through the gearbox and the like, thereby driving the electric generator.

In recent years, electric power demand in aircraft has been increasing in accordance with requests from the More Electric Aircraft (MEA) or the like. Therefore, as well as the conventional power generation system using the extraction force from the high-pressure shaft, a power generation system using the extraction force from a low-pressure shaft (low-pressure spool) connecting between the low-pressure compressor and the low-pressure turbine has been proposed (see JP 2006-153013 A).

SUMMARY

As described above, an increase in the demand for electric power is expected in the future, and it is necessary for electric generators to have an output of several tens to several hundred kW. As the maximum output increases, the size of the electric generator inevitably increases. Since the rotor becomes large and its weight also increases, the rotor needs to be supported by bearings or the like. Therefore, the movement of the rotor in the axial direction is limited by the bearing.

The low-pressure shaft is supported by bearings in the engine. A part of the low-pressure shaft on the rear end side is supported by a roller bearing or the like for the shaft to be allowed to expand or contract in the axial direction. Therefore, when the electric generator is mounted on the low-pressure shaft as in Patent Literature 1, a mechanism such as a spline coupling, which allows the expansion and contraction, is required. However, the low-pressure shaft is very finely designed to maintain its rotational balance. Therefore, when the electric generator is connected to the low-pressure shaft, it is necessary to avoid interference with the rotation of the low-pressure shaft as much as possible.

The present disclosure is made under the consideration of the above situation, and its object is to provide an electric generator driven by a low-pressure shaft of a multi-shaft gas turbine engine for an aircraft without interfering with the operation of the low-pressure shaft, and a multi-shaft gas turbine engine for an aircraft including the electric generator.

A first aspect of the present disclosure is an electric generator equipped in a multi-shaft gas turbine engine for aircraft, including: a rotor attached to the rear end portion of a low-pressure shaft rotatably supported by a bearing in the gas turbine engine; a stator provided around the rotor; wherein the electric generator has no structure to support the low-pressure shaft and the rotor.

The stator may be separated from the rotor by a distance allowing a displacement of the rotor due to the warpage of the low-pressure shaft. The rotor may be attached to the low-pressure shaft in a state where the low-pressure shaft is inserted into the rotational center of the rotor. The rotor may include magnets arranged in a circumferential direction of the rotor, and the stator may include a multilayer coil formed of a belt-like electric wire.

A second aspect of the present disclosure is a multi-shaft gas turbine engine for an aircraft including the electric generator according to the first aspect.

According to the present disclosure, it is possible to provide an electric generator driven by a low-pressure shaft of a multi-shaft gas turbine engine for an aircraft without interfering with the operation of the low-pressure shaft, and a multi-shaft gas turbine engine for an aircraft including the electric generator.

DESCRIPTION OF THE EMBODIMENTS

Figure 1:
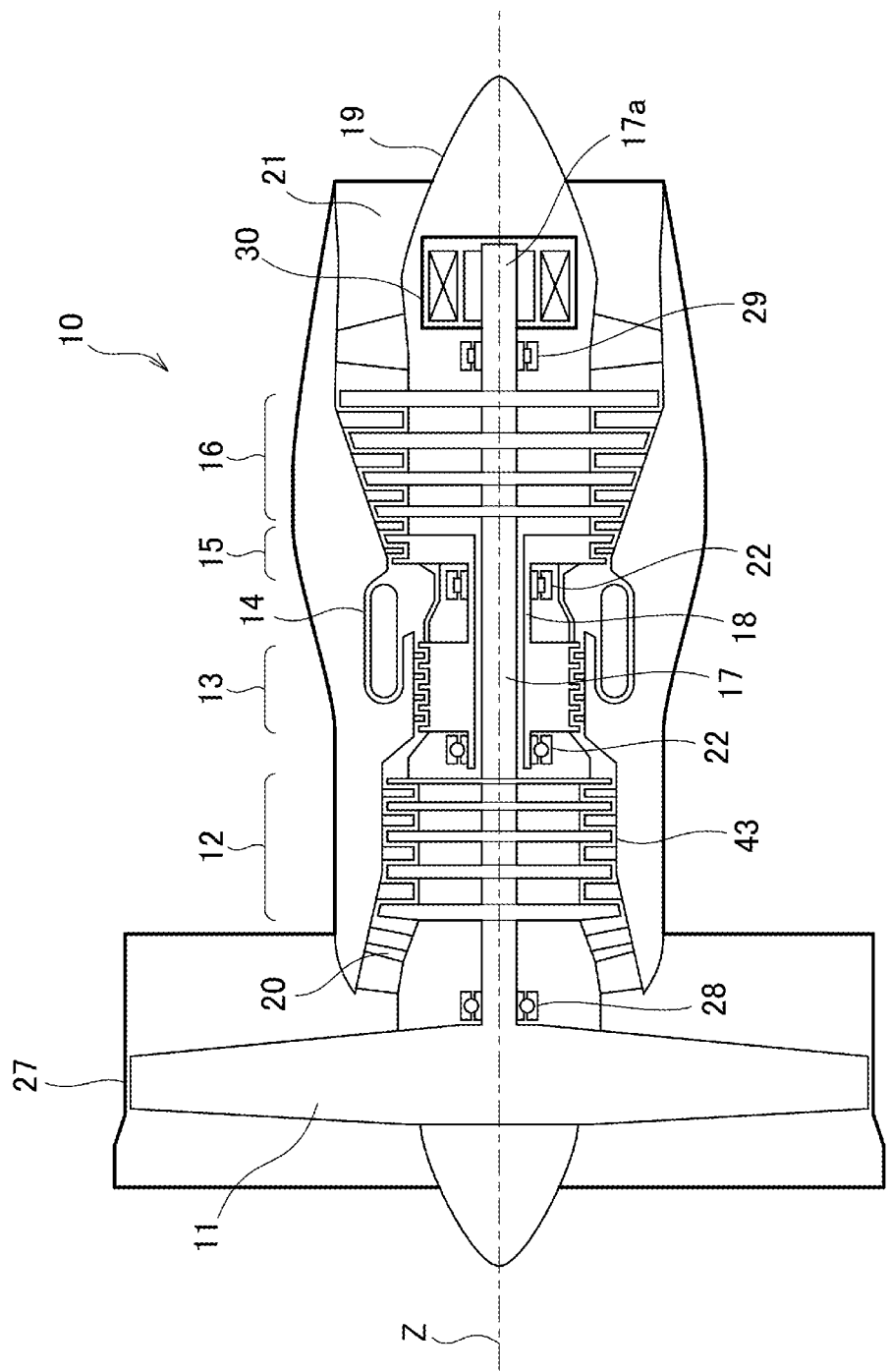
FIG. 1 is a configuration diagram illustrating a gas turbine engine for an aircraft equipped with an electric generator according to an embodiment of the present disclosure.

Hereinafter, an electric generator according to an embodiment of the present disclosure will be described with reference to drawings. The same reference numerals are used to denote parts common to each of the drawings, and redundant explanation thereof will be omitted.

A gas turbine engine for aircraft according to the present embodiment is, for example, a turbofan engine, a turbojet engine, a turboprop engine, a turboshaft engine, or the like. The gas turbine engine according to the present embodiment is a multi-shaft gas turbine engine having plural stages of compressors and turbines. In the following description, a turbofan engine is taken as an example of a multi-shaft gas turbine engine for aircraft, and it is simply referred to as an engine for convenience of explanation.

Figure 2:
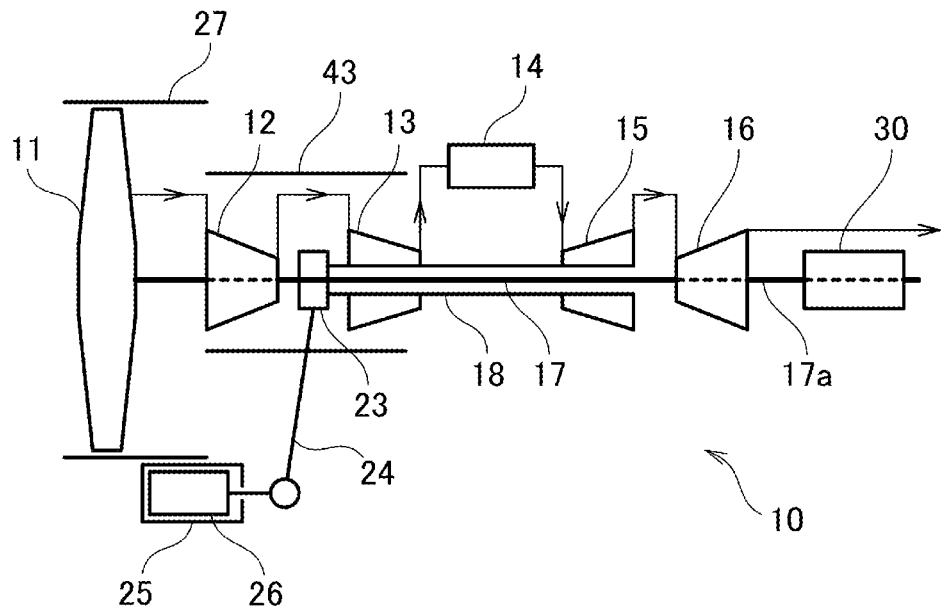
FIG. 2 is a block diagram illustrating the aircraft gas turbine engine according to the embodiment of the present disclosure.

FIG. 1 is a configuration diagram illustrating an engine 10 equipped with an electric generator 30 according to the present embodiment. FIG. 2 is a block diagram illustrating the engine 10. As shown in FIG. 1, the engine 10 is a two-shaft turbofan engine. The engine 10 includes a fan 11, a low-pressure compressor 12, a high-pressure compressor 13, a combustion chamber 14, a high-pressure turbine 15, and a low-pressure turbine 16.

The low-pressure compressor 12 and the low-pressure turbine 16 are connected via a low-pressure shaft (low-pressure spool) 17, and the high-pressure compressor 13 and the high-pressure turbine 15 are connected via a high-pressure shaft (high-pressure spool) 18. The engine according to the present embodiment may be of a three-shaft type, which further includes a medium-pressure compressor (not shown), a medium-pressure turbine (not shown), and a medium-pressure shaft (Medium pressure spool, not shown) for connecting the medium-pressure compressor and the medium-pressure turbine. In any case, the electric generator 30 according to the present embodiment is installed in a tail cone 19 and driven by the low-pressure shaft 17.

The basic configuration and operation of the engine 10 (i.e., the compression, combustion, conversion of pressure energy into kinetic (rotational) energy of gas, and so on) are the same as those of conventional engines. Specifically, the fan 11 takes in gas (working fluid) and discharges it backward. A part of the gas having passed through the fan 11 flows into the low-pressure compressor 12 through a core flow passage 20. The low-pressure compressor 12 compresses the gas flowing in from the fan 11 and discharges it to the high-pressure compressor 13. The high-pressure compressor 13 further compresses the gas having been compressed by the low-pressure compressor 12 and supplies it to the combustion chamber 14.

The combustion chamber 14 burns the mixed gas of the fuel and the gas having been compressed by the high-pressure compressor 13 and discharges it to the high-pressure turbine 15. The combustion gas expands and rotates the high-pressure turbine 15 while passing through the high-pressure turbine 15. This rotational energy is transmitted to the high-pressure compressor 13 via a high-pressure shaft 18, thereby rotating the high-pressure compressor 13.

The combustion gas having passed through the high-pressure turbine 15 further expands while passing through the low-pressure turbine 16, thereby rotating the low-pressure turbine 16. This rotational energy is transmitted to the low-pressure compressor 12 and the fan 11 via the low-pressure shaft 17, and thus the low-pressure compressor 12 and the fan 11 are rotated. The combustion gas having passed through the low-pressure turbine 16 is discharged to the outside of the engine 10 through a duct 21.

The high-pressure shaft 18 is rotatably supported by bearings 22 and 22 provided in the engine 10. As shown in FIG. 2, an internal gear box 23 is provided at the front end of the high-pressure shaft 18. The internal gear box 23 includes gears (not shown) and extracts a part of the rotational energy of the high-pressure shaft 18. The extracted rotational energy is transmitted to an accessory gear box (AGB) 25 via a drive shaft 24 and the like.

The AGB 25 is disposed in the vicinity of the fan case 27 or the compressor casing 43, and houses auxiliary machines (not shown) such as a fuel pump and a starter. The AGB 25 also houses an electric generator 26. The electric generator 26 includes an alternator and a generator. The alternator is an electric generator dedicated to the engine. The generator covers the whole electric power except for the electric power for the engine. These are driven by the rotational energy of the high-pressure shaft 18 transmitted through the drive shaft 24.

The low-pressure shaft 17 is rotatably supported by bearings 28 and 29 provided in the engine 10. The bearing 28 is provided forward in the engine 10, for example, between the fan 11 and the low-pressure compressor 12. The bearing 28 is a ball bearing and regulates the axial movement of the low-pressure shaft 17. The bearing 29 is provided rearward in the engine 10 and positioned rearward of the low-pressure turbine 16. The bearing 29 is a roller bearing and allows the axial movement of the low-pressure shaft 17. That is, the low-pressure shaft 17 is rotatably supported in a state in which its extension due to thermal expansion is allowed.

As shown in FIG. 1, the tail cone 19 houses an electric generator 30. The electric generator 30 is connected to the low-pressure shaft 17, is driven by the rotational energy of the low-pressure shaft 17. The electric generator 30 supplies electric power to at least one of the aircraft and the engine 10. Hereinafter, the electric generator 30 will be described.

Figure 3:
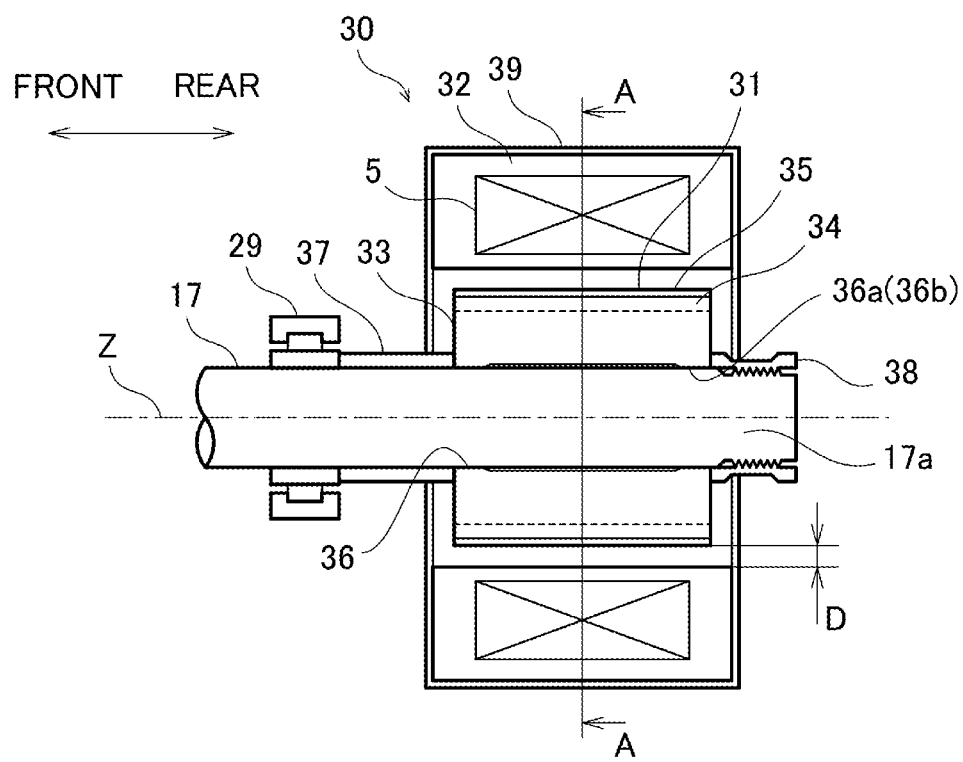
FIG. 3 is an enlarged view illustrating the electric generator and its surroundings according to the embodiment of the present disclosure.
Figure 4:
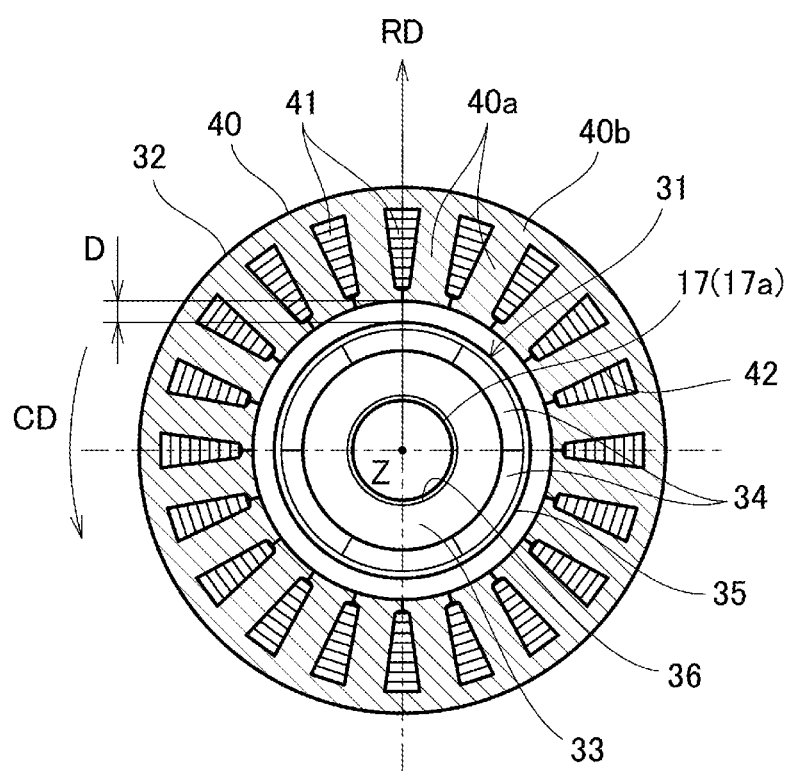
FIG. 4 is a cross-sectional view taken along the line A-A of FIG. 3.

FIG. 3 is an enlarged view illustrating the electric generator 30 and its surroundings. FIG. 4 is a cross-sectional view taken along the line A-A of FIG. 3. As shown in these figures, the electric generator 30 includes a rotor 31 and a stator 32. The electric generator 30 according to the present embodiment is a synchronous electric generator, and the source (i.e., field system) of the magnetic field is the rotor 31.

The rotor 31 is attached to a rear end portion 17a of the low-pressure shaft 17 in a state where the low-pressure shaft 17 is inserted into the rotational center (i.e., the central axis Z) of the rotor 31. In other words, the rotor 31 is attachably provided to the rear end portion 17a of the low-pressure shaft 17 in the above-described state. The rearmost part of the rear end portion 17a of the low-pressure shaft 17 is located rearward of the rotor 31. To the rearmost part, a fastening member 38 described later is attached, for example. The rotor 31 is directly connected to the rear end portion 17a of the low-pressure shaft 17, and rotates integrally with the low-pressure shaft 17 at the same speed.

The electric generator 30 does not have a structure to support the low-pressure shaft 17 and the rotor 31, such as a bearing. In other words, the electric generator 30 has no mechanism for defining a gap between the rotor 31 and the stator 32. That is, the position of the rotor 31 attached to the low-pressure shaft 17 is maintained by the bearing 29 of the low-pressure shaft 17 in the engine 10.

The rotor 31 includes a rotor core (core member) 33, a plurality of magnets 34, and a retaining sleeve 35. The rotor core 33 is a ferromagnetic metal member. The rotor core 33 is formed in a cylindrical shape extending along the central axis Z. The rotor core 33 has an insertion hole 36. The insertion hole 36 is centered on the central axis Z and extends along the central axis Z. The rear end portion 17a of the low-pressure shaft 17 is inserted into the insertion hole 36.

The inner surface 36a of the insertion hole 36 has, at least in part, a fitting surface 36b to the rear end portion 17a of the low-pressure shaft 17. The fitting surface 36b is formed annularly over the entire circumference around the central axis Z, and regulates wobbling (i.e., axial deviation and inclination) between the low-pressure shaft 17 and the rotor 31 while when the low-pressure shaft 17 is inserted into the insertion hole 36. Therefore, the diameter (inner diameter) of the fitting surface 36b is substantially equal to the diameter (outer diameter) of the rear end portion 17a of the low-pressure shaft 17 opposed to the fitting surface 36b, and is set to a value such that friction occurs at the time when the rotor 31 is attached.

The rotor 31 is attached to the low-pressure shaft 17 by sandwiching with a pair of fastening members 37 and 38, for example. The fastening member 37 is an annular member slidably mounted on the low-pressure shaft 17. The fastening member 37 is positioned between the bearing 29 and the rotor 31. The fastening member 38 is an annular member screwed to the low-pressure shaft 17 from the rear of the low-pressure shaft 17. The fastening member 38 approaches the bearing 29 as the screwing advances. With this approach, the fastening member 37 and the rotor 31 are pressed toward the bearing 29. Further screwing of the fastening member 38 causes the fastening member 37 to be in contact with the inner ring of the bearing 29. With this contact, the movements of the fastening member 37 and the rotor 31 are regulated. As the result, the rotor 31 is held between the fastening member 37 and the fastening member 38, and the position of the rotor 31 is retained.

The plurality of magnets 34 are disposed on the outer periphery of the rotor core 33. The magnets 34 are arranged in the circumferential direction CD while alternating polarities thereof. It is preferable that each magnet 34 has sufficient magnetic force and high mechanical strength. The magnet 34 having such properties is, for example, a permanent magnet such as a neodymium magnet or a samarium-cobalt magnet. However, the magnet 34 is not limited to the neodymium magnet or the samarium-cobalt magnet, and may be a magnet which satisfies a desired magnetic force, mechanical strength, and so on.

The retaining sleeve 35 is an annular member made of a non-magnetic metal. The retaining sleeve 35 retains the magnet 34 from the outside by its rigidity. Thus, the retaining sleeve 35 has a dimension (inner diameter) that maintains the relative position of the magnet 34 with respect to the rotor core 33.

The stator 32 is provided around the rotor 31. The stator 32 is separated from the rotor 31 by a distance D allowing a displacement of the rotor 31 due to the warpage of the low-pressure shaft 17. In other words, the opposing surfaces of the stator 32 and the rotor 31 are separated by the distance D in the radial direction RD. The value of the distance D is set mainly in consideration of the size and material of the low-pressure shaft 17. The distance D according to the present embodiment is about 4 mm, for example.

The stator 32 is retained in a casing (housing) 39 which houses the stator 32. The casing 39 is attached to a predetermined member of the engine 10 that does not move relative to the stator 32.

The stator 32 includes a stator core 40 and a multilayer coil 41. The stator core 40 has magnetic poles 40a and a yoke 40b magnetically coupling the magnetic poles 40a. The magnetic poles 40a extend radially (in the radial direction RD) with the central axis Z as the reference axis, and also extend along the central axis Z. The magnetic poles 40a are arranged at a constant angular interval in the circumferential direction CD. The yoke 40b is formed in a hollow cylindrical shape surrounding the magnetic poles 40a. The yoke 40b supports the respective magnetic poles 40a and magnetically couples them.

The multilayer coil 41 is disposed in a space 42 between two magnetic poles 40a and 40a that are adjacent to each other. The multilayer coil 41 according to the present embodiment is formed of a belt-like electric wire stacked (laminated) in the radial direction RD. The belt-like electric wire is, for example, a wire having a rectangular cross section (i.e., rectangular wire). The stacking of belt-like electric wire improves the space factor. The multilayer coil 41 is cooled by cooling oil flowing in the stator 32.

As described above, the electric generator 30 has no structure to support the rotor 31. Further, with the direct connection between the rotor 31 and the low-pressure shaft 17, there is no device such as a clutch or a constant speed-drive unit between the low-pressure shaft 17 and the electric generator 30. Accordingly, the electric generator is driven by the low-pressure shaft 17 without interfering with the operation (i.e., expansion, contraction and rotation) of the low-pressure shaft 17. Further, since a coupling structure such as a spline coupling or a joint is not required, the problem that the lifetime of such a connection structure cannot be sufficiently ensured can be fundamentally avoided.

The bearing 29 of the low-pressure shaft 17 in the engine 10, which is normally installed, supports the rotor 31. In other words, any structure for supporting the rotor 31 such as a bearing is not newly added. Further, as described above, a device such as a constant speed-drive unit is not provided. This means that the present embodiment does not add a structure (device) that contacts the low-pressure shaft 17 at a relatively different speed with respect to the low-pressure shaft 17. Accordingly, since there is no mechanical structure (device) that interferes with the rotation of the low-pressure shaft 17, it is possible to satisfy the increasing power demand while ensuring the reliability (safety) of the engine 10.

The rotor 31 is attached to the low-pressure shaft 17 in a state where the low-pressure shaft 17 is inserted into the rotational center of the rotor 31. Therefore, it is possible to avoid an excessive increase in the overall length of the engine 10 due to the installation of the electric generator 30. For example, it is possible to surpress an excessive increase in the dimension (length) of the tail cone 19, and avoid a significant design change of the tail cone 19.

The low-pressure shaft 17 supporting the rotor 31 possibly warps when the engine 10 is operated (i.e., when the low-pressure shaft 17 is rotated), and the position of the rotor 31 is possibly shifted due to this warpage. In other words, due to this warpage, the rotor 31 may come into contact with the stator 32. However, the distance D between the rotor 31 and the stator 32 is set to a value that allows a positional shift of the rotor 31 due to this warpage. Therefore, it is possible to prevent the rotor 31 and the stator 32 from colliding with each other during the operation of the engine 10 and to prevent the electric generator 30 from being damaged due to the collision.

The distance D is larger than the distance between the rotor 31 and the stator 32, which would be expected if the warpage of the low-pressure shaft 17 were ignored. On the other hand, in the present embodiment, a belt-like electric wire is used for the multilayer coil 41 of the stator 32, and the space factor is increased by stacking (laminating) the belt-like electric wire. That is, by improving the space factor, the increase in magnetoresistance and the decrease in power generation efficiency due to the increase in the aforementioned distance are compensated. In other words, it is possible to secure a high magnetomotive force in a limited space, generate sufficient torque even if there is a large gap, and obtain high power generation efficiency.

The electric generator 30 may be used in combination with the electric generator 26 installed in the AGB 25 as described above, or may be used alone with omitting the electric generator 26. When the electric generator 30 and the electric generator 26 are used in combination, the upsizing of them can be suppressed, so that the increase in the power demand can be met while the increase in the power loss in the AGB 25 can be suppressed. When the electric generator 30 is used alone, the total weight of the engine 10 can be reduced by omitting the electric generator 26.

It should be noted that the present disclosure is not limited to the embodiments described above, is shown by the description of the claims, and further includes all modifications within the meaning and scope of the same as the description of the claims.

What is claimed is:

1. An electric generator equipped in a multi-shaft gas turbine engine for aircraft, comprising:
    a rotor directly attached without a clutch to a rear end portion of a low-pressure shaft rotatably supported by a bearing in the gas turbine engine; and
    a stator provided around the rotor and radially outward of the rotor, wherein
    the electric generator has no structure to support the low-pressure shaft and the rotor.

2. The electric generator according to claim 1,
    the stator is separated from the rotor by a distance allowing a displacement of the rotor due to warpage of the low-pressure shaft.

3. The electric generator according to claim 2, comprising a pair of fastening members configured to sandwich the rotor, wherein
    a first fastening member of the pair of fastening members is an annular member slidably mounted on the low-pressure shaft between the bearing and the rotor, and
    a second fastening member of the pair of fastening members is an annular member screwed to the low-pressure shaft to press the rotor toward the first fastening member.

4. The electric generator according to claim 1,
    the rotor is attached to the low-pressure shaft in a state where the low-pressure shaft is inserted into a rotational center of the rotor.

5. The electric generator according to claim 4, comprising a pair of fastening members configured to sandwich the rotor, wherein
    a first fastening member of the pair of fastening members is an annular member slidably mounted on the low-pressure shaft between the bearing and the rotor, and
    a second fastening member of the pair of fastening members is an annular member screwed to the low-pressure shaft to press the rotor toward the first fastening member.

6. The electric generator according to claim 1, wherein
the rotor includes magnets arranged in a circumferential direction of the rotor, and
the stator includes a multilayer coil formed of a belt-like electric wire.

7. The electric generator according to claim 6, comprising a pair of fastening members configured to sandwich the rotor, wherein
    a first fastening member of the pair of fastening members is an annular member slidably mounted on the low-pressure shaft between the bearing and the rotor, and
    a second fastening member of the pair of fastening members is an annular member screwed to the low-pressure shaft to press the rotor toward the first fastening member.

8. The electric generator according to claim 1, comprising a pair of fastening members configured to sandwich the rotor, wherein
    a first fastening member of the pair of fastening members is an annular member slidably mounted on the low-pressure shaft between the bearing and the rotor, and
    a second fastening member of the pair of fastening members is an annular member screwed to the low-pressure shaft to press the rotor toward the first fastening member.

9. A multi-shaft gas turbine engine for an aircraft comprising the electric generator according to claim 1.

10. The electric generator according to claim 1, wherein
the rotor is provided with an insertion hole into which the rear end portion of the low-pressure shaft is inserted, and
an inner surface of the insertion hole has, at least in part, a fitting surface which regulates wobbling of the rotor with respect to the low-pressure shaft.

11. The electric generator according to claim 1, wherein
the stator includes magnetic poles provided radially, and
the rotor includes magnets arranged in a circumferential direction of the rotor and facing the magnetic poles in a radial direction of the rotor.

* * * * *